(12) United States Patent
Inoue et al.

(10) Patent No.: US 6,270,741 B1
(45) Date of Patent: Aug. 7, 2001

(54) OPERATION MANAGEMENT METHOD OF IRON CARBIDE PRODUCTION PROCESS

(75) Inventors: Eiji Inoue; Torakatsu Miyashita, both of Kobe; Yoshio Uchiyama, Akashi; Junya Nakatani, Kobe; Teruyuki Nakazawa, Koganei; Akio Nio, Kiyose, all of (JP)

(73) Assignee: Kawasaki Jukogyo Kabushiki Kaisha Mitsubishi Corporation, Hyogo (JP)

( * ) Notice: Subject to any disclaimer, the term of this patent is extended or adjusted under 35 U.S.C. 154(b) by 0 days.

(21) Appl. No.: 09/367,025

(22) PCT Filed: Feb. 25, 1998

(86) PCT No.: PCT/JP98/00793

§ 371 Date: Aug. 6, 1999

§ 102(e) Date: Aug. 6, 1999

(87) PCT Pub. No.: WO98/38130

PCT Pub. Date: Sep. 3, 1998

(30) Foreign Application Priority Data

Feb. 28, 1997 (JP) .................................................. 9-045515

(51) Int. Cl.[7] .................................................. C01B 31/30
(52) U.S. Cl. .................................................. 423/439
(58) Field of Search .................................. 423/439, 138, 423/151

(56) References Cited

U.S. PATENT DOCUMENTS 5,073,194  12/1991  Stephens et al. .
5,366,897  11/1994  Hager et al. .
5,837,031 * 11/1998  Miyashita et al. ..................... 75/505

FOREIGN PATENT DOCUMENTS 9-48604   2/1997  (JP) .

OTHER PUBLICATIONS

LU 62 514 A (Centre National de Recherches Metallirgiques) Aug. 10, 1971 *the whole document8.
Patent Abstract of Japan, Pub. No. 57181334, Pub. Date Aug. 11, 1982, App. date Apr. 28, 1981; App. No. 56064822—Title: Quality controlling Method for Sintered Ore.
Institute of Electrical Engineers, Hirano et al.; "Synthesis of magnetic properties of iron carbide", J. Journal of the Japan Society of Powder and Powder Metallurgy, Apr. 1990, Japan, vol. 37, No. 3, pp. 421–425.

* cited by examiner

Primary Examiner—Steven P. Griffin
Assistant Examiner—Eileen E. Nave

(57) ABSTRACT

Provided is a method for managing an operation of a producing process for obtaining an iron carbide product having a goal composition in a two-stages reaction process. A first-stage reaction process for partially reducing an iron-containing material for iron making is carried out, and a second-stage reaction process for performing further reduction and carburization is then carried out. A solid sample is taken at an outlet of a reactor for the first-stage reaction process to measure a reduction ratio of the solid sample. By regulating a parameter capable of changing a reduction ratio of the first-stage reaction process, an IC ratio obtained after the second-stage reaction process can be adjusted.

2 Claims, 3 Drawing Sheets

OPERATION MANAGEMENT METHOD OF IRON CARBIDE PRODUCTION PROCESS

TECHNICAL FIELD

The present invention relates to a method for setting proper process conditions in producing iron carbide suitable for a raw material for iron making and steel making which comprises iron carbide ($Fe_3C$) as the main component, for example, a raw material for steel making which is used in an electric furnace and the like.

BACKGROUND ART

The production of steel normally comprises the steps of converting iron ore to pig iron using a blast furnace, and thereafter converting the pig iron into steel using an open hearth furnace or a converter. Such a traditional method requires large amounts of energy and large-scale equipment, and has a high cost. Therefore, for a small-scale steel-making, a method comprising the steps of directly converting iron ore into raw materials used in the steel-making furnace, and converting the raw material into steel using an electric furnace and the like has been used. With respect to direct steel making process, a direct reduction process has been used to convert iron ore into reduced iron. However, the reduced iron produced by the direct reduction process is highly reactive and reacts with oxygen in the air to generate heat. Therefore, it is necessary to seal the reduced iron with an inert gas, or by some other measures, during transportation and storage of the reduced iron. Accordingly, iron carbide ($Fe_3C$) containing a comparatively high iron (Fe) content, which has a low reaction activity and can be easily transported and stored, has recently been used as the iron-containing material for steel making in an electric furnace and the like.

Furthermore, an iron-making or steel-making material containing iron carbide as the main component is not only easy to be transported and stored, but also has the advantage that the carbon combined with iron element can be used as a source of fuel in an iron-making or steel-making furnace, and can be used as a source to generate microbubbles which accelerate the reaction in the steel-making furnace. Therefore, raw materials for iron making or steel making containing iron carbide as the main component recently have attracted special interest.

According to a conventional method for producing iron carbide, fine-sized iron ore is charged into a fluidized bed reactor or the like, and is caused to react with a gas mixture comprising a reducing gas (e. g., hydrogen gas) and a carburizing gas (e.g., methane gas and the like) at a predetermined temperature. Thus, iron oxides (e. g., hematite ($Fe_2O_3$), magnetite ($Fe_3O_4$), wustite (FeO)) in iron ore are reduced and carburized in a single process (which means a process performed by simultaneously introducing a reducing gas and a carburizing gas to a single reactor). The prior art in the field of the present invention has been described, for example, in the publication No. 6-501983 of the Japanese translation of International Patent Application (PCT/US91/05198).

The iron carbide producing process can be expressed by the following general reaction formula.

$$3Fe_2O_3 + 5H_2 + 2CH_4 \rightarrow 2Fe_3C + 9H_2O$$

In the single process, however, reducing reaction and carburizing reaction should be taken into consideration together. In addition, a reaction gas composition and a reaction gas temperature which are suitable for each reaction cannot be applied. As a result, a reaction time (which is required for conversion into iron carbide) becomes longer. As compared with a conventional method, it takes a longer time to obtain a constant amount of raw materials for steel making. For this reason, there is a drawback that an equipment scale should be enlarged to increase the production per unit time.

The present inventors have filed a patent application Japanese Patent Application No. 8-30985) related to novel technology for a method and apparatus for producing iron carbide which can perform various actions for each operation, increase flexibility as a process, shorten a reaction time and reduce an amount of a reaction gas to be used. This invention relates to a method for producing iron carbide comprising the steps of performing a first-stage reaction process for carrying out a part of reducing reaction of iron ore comprising hematite as the main component and then performing a second-stage reaction process for carrying out further reducing and carburizing reaction and has eliminated all drawbacks of the conventional iron carbide producing method and is an epoch-making method for producing iron carbide.

However, also in the case where iron carbide is produced in the two-stages reaction process, an iron carbide product having a goal composition cannot always be obtained.

The reason is as follows. A lot of reaction parameters such as a reaction gas composition, a reaction temperature, a reaction pressure and the like are concerned in generation of the iron carbide. In some cases, the reaction parameters are slightly changed so that undesired products (having a low rate of conversion into iron carbide, for example) are obtained. If the reaction parameters get out of a constant range, free carbon is sometimes generated.

There has been proposed a method for controlling quality of an iron carbide product characterized in that whether a composition of an obtained product can be permitted or not is checked by the Mössbauer analysis method in order to control a composition of an iron carbide product within a constant range, and the reaction parameters are changed if the composition is not kept within a tolerance. (For example, see U.S. Pat. No. 5073194, PCT/US91/05188).

However, the Mössbauer analyzer has a drawback that it takes a long time (1 to 4 hours) to perform the measurement in order to enhance the precision. Accordingly, there has been a problem that it is impossible to take the proper actions corresponding to conditions in a reactor which are changed momently.

In consideration of the above-mentioned problems of the prior art, it is an object of the present invention to provide a method for managing an operation of a producing process for obtaining an iron carbide product having a goal composition in a two-stages reaction process.

DISCLOSURE OF INVENTION

In order to attain the above-mentioned object, the present invention is characterized in that a reduction ratio obtained after a first-stage reaction process is changed on the basis of the knowledge that the reduction ratio obtained after the first-stage reaction process and an iron carbide ratio (hereinafter referred to as an IC ratio) obtained after a second-stage reaction process has a correlation therebetween, thereby regulating the IC ratio obtained after the second-stage reaction process.

The present invention provides a method for managing an operation of an iron carbide producing process, comprising the steps of performing a first-stage reaction process for partially reducing various iron-containing materials for iron making, and then performing a second-stage reaction process for carrying out further reduction and carburization, is characterized in that a solid sample at an outlet of a reactor for the first-stage reaction process is taken to measure a reduction ratio of the solid sample, and a parameter capable of changing the reduction ratio of the first-stage reaction process is regulated to adjust an IC ratio obtained after the second-stage reaction process.

In general, if the reduction ratio of the first-stage reaction process is decreased, a time required for generating iron carbide in the second-stage reaction process is increased. On the other hand, if the reduction ratio of the first-stage reaction process is increased, the time required for generating iron carbide in the second-stage reaction process is shortened. More specifically, in the case where a predetermined iron-containing material for iron making is reduced and carburized in the two-stages reaction process, assuming that a reaction time is set constant, the IC ratio obtained after the second-stage reaction process is decreased if the reduction ratio of the first-stage reaction process is decreased, and the IC ratio obtained after the second-stage reaction process is increased if the reduction ratio of the first-stage reaction process is increased. Accordingly, the IC ratio obtained after the second-stage reaction process can be controlled by regulating parameters capable of changing a reduction ratio of the first-stage reaction process, that is, a reaction temperature, a reaction pressure, a gas composition, a bed height of a fluidized bed and the like, as described above. Examples of a sure method for measuring a reduction ratio of a solid sample includes a method for analyzing a composition of a solid. However, X-ray diffraction or the like takes a long time to perform measurement. Therefore, it is preferable that a relationship between a magnetic permeability and a reduction ratio should be previously obtained and a magnetic permeability should be measured on the basis of the relationship, thereby obtaining a reduction ratio conveniently and rapidly.

Also, the solid sample can be taken between the middle and last chambers of the reactor for the first-stage reaction process in place of the solid sample at the outlet of the reactor for the first-stage reaction process, and the parameter capable of changing the reduction ratio of the first-stage reaction process can be regulated corresponding to a correlation between the reduction ratio of the solid sample and the reduction ratio obtained after the first-stage reaction process, thereby adjusting the IC ratio obtained after the second-stage reaction process. In the case where the inside of a reactor for the first-stage reaction process is divided into a lot of chambers, a change in conditions of a fed iron-containing material (for example, a change in a preheating temperature caused by a fluctuation of water content in iron ore) can be detected early if a reduction ratio is measured by taking a solid sample between the middle and last chambers of the reactor for the first-stage reaction process, as described above. By properly regulating operating conditions of the reactor for the first-stage reaction process (a reaction temperature, a reaction pressure, a bed height of a fluidized bed and the like) corresponding to a correlation between the reduction ratio of the solid sample and the reduction ratio obtained after the first-stage reaction process, the reduction ratio obtained after the first-stage reaction process can be changed. Consequently, the IC ratio obtained after the second-stage reaction process can be controlled.

Also, the solid sample can be taken between the middle and last chambers of a reactor for the second-stage reaction process in place of the solid sample at the outlet of the reactor for the first-stage reaction process, and the parameter capable of changing the IC ratio obtained after the second-stage reaction process can be regulated corresponding to a correlation between an IC ratio of the solid sample and the IC ratio obtained after the second-stage reaction process, thereby adjusting the IC ratio obtained after the second-stage reaction process. In the case where the inside of a reactor for the second-stage reaction process is divided into a lot of chambers, a change in conditions of a fed iron-containing material (for example, a change in a preheating temperature caused by a fluctuation of water content in iron ore) can be detected early if an IC ratio is measured by taking a solid sample between the middle and last chambers of the reactor for the second-stage reaction process, as described above. By properly regulating operating conditions of the reactor for the second-stage reaction process (a reaction temperature, a reaction pressure, a bed height of a fluidized bed and the like) corresponding to a correlation between the IC ratio of the solid sample and the IC ratio obtained after the second-stage reaction process, the IC ratio obtained after the second-stage reaction process can be controlled.

In up-stream chambers to the middle chamber of the reactor (which are closer to an inlet of the reactor), the reaction does not progress uniformly. Therefore, a fluctuation of a composition of the taken solid sample is great. For this reason, the forward chambers to the middle chamber of the reactor are not suitable for positions in which the solid sample is taken. As described above, it is preferable that the solid sample should be taken between the middle and last chambers of the reactor.

Alternatively, the reduction ratio of the solid sample is not measured but an outlet gas composition is measured after mixing at an outlet of the reactor and is compared with an inlet gas composition. Thus, a degree of the progress in the reaction of the solid can be decided. So, an exhaust gas sample can be taken for each chamber between the first and last chambers of the reactor for the first-stage reaction process in place of the solid sample at the outlet of the reactor for the first-stage reaction process, and a gas composition of the reactor for the first-stage reaction process can be regulated corresponding to a correlation between the gas composition of the exhaust gas and the reduction ratio obtained after the first-stage reaction process, thereby adjusting the IC ratio obtained after the second-stage reaction process. In the case where the inside of the reactor for the first-stage reaction process is divided into a lot of chambers, it is preferable that a gas composition of each chamber should be measured to perceive a change in the reaction of each chamber. As described above, a composition of an exhaust gas of each chamber is measured so that the degree of progress in the reaction of the solid can be estimated with high precision and the abnormalities in the reactor can be detected early. Therefore, the gas composition of the reactor for the first-stage reaction process is appropriately regulated corresponding to a correlation between the composition of the exhaust gas and the reduction ratio obtained after the first-stage reaction process, thereby changing the reduction ratio obtained after the first-stage reaction process. Consequently, the IC ratio obtained after the second-stage reaction process can be controlled.

Furthermore, an exhaust gas sample can be taken for each chamber between the first and last chambers of a reactor for the second-stage reaction process in place of the solid sample at the outlet of the reactor for the first-stage reaction process, and a gas composition of the reactor for the second-stage reaction process can be regulated corresponding to a correlation between the gas composition of the exhaust gas and the IC ratio obtained after the second-stage reaction process, thereby adjusting the IC ratio obtained after the second-stage reaction process. In the case where the inside of the reactor for the second-stage reaction process is divided into a lot of chambers, a gas composition of each chamber can be measured to estimate a degree of progress in the reaction of the solid with high precision and the abnormalities in the reactor can be detected early, as described above. Therefore, the gas composition of the reactor for the second-stage reaction process is appropriately regulated corresponding to a correlation between the composition of the exhaust gas and the IC ratio obtained after the second-stage reaction process. Consequently, the IC ratio obtained after the second-stage reaction process can be controlled.

According to the present invention having the above-mentioned constitution, in producing the iron carbide in the fluidized bed reactor, the two-stages reaction process for performing the further reducing and carburizing reaction after the partial reducing reaction can be performed under the proper operating conditions. Therefore, the iron carbide product having a goal composition can be efficiently produced.

Also, according to the present invention, in the case where the product composition gets out of the range of the goal product composition, the proper operating conditions are selected corresponding to the state in the fluidized bed reactor so that the operation of the fluidized bed reactor can be easily managed.

Furthermore, in the case where the present invention is applied to a rectangular (cross flow) moving bed reactor as well as the fluidized bed reactor, the same effects can be also obtained.

BEST MODE FOR CARRYING OUT THE INVENTION

An embodiment of the present invention will be described below with reference to the drawings.

(1) Experimental Apparatus

Figure 1:
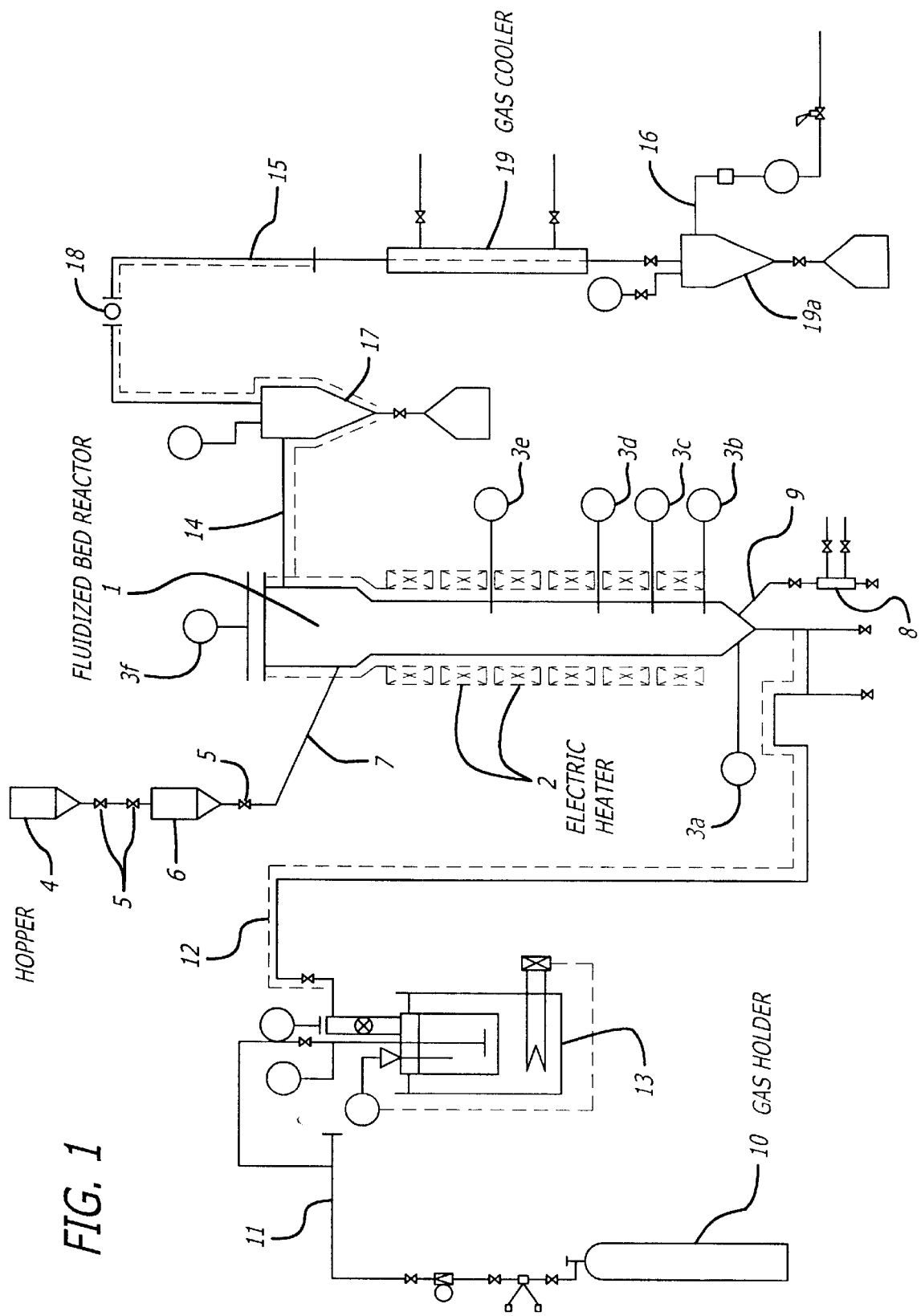
FIG. 1 is a view showing an example of a schematic structure of an experimental apparatus for applying a method for producing iron carbide according to the present invention.

An example of an experimental apparatus for applying a method for producing iron carbide according to the present invention comprises fluidized bed reactor 1 and peripheral apparatus thereof as shown in FIG. 1. Fluidized bed reactor 1 generally has a cylindrical shape and was provided with electric heater 2 on the outside thereof to set a predetermined temperature. Pipe of 50A (nominal size, outside diameter of 60.5 mm) was used as a principal part of fluidized bed reactor 1. In addition, temperature-detecting sensors 3a, 3b, 3c, 3d, 3e and 3f were positioned along the length of fluidized bed reactor 1 at 127 mm, 187 mm, 442 mm, 697 mm and 1707 mm from the bottom of fluidized bed reactor 1, and at the top of fluidized bed reactor 1, respectively, in order to measure the temperature of the inside of fluidized bed reactor 1.

Hopper 4 was connected to the upper portion of fluidized bed reactor 1 by line 7 via lock hopper 6 having valve 5 provided in the front and in the rear. Consequently, a fine-sized feed (for example, an iron ore material comprising hematite ($Fe_2O_3$) as the main component) could be caused to flow from hopper 4 into fluidized bed reactor 1 in a pressurized state. In addition, line 9 having cooler 8 attached thereto was connected to the bottom of fluidized bed reactor 1 to cool and discharge the feed (raw material) in fluidized bed reactor 1.

The bottom of fluidized bed reactor 1 was connected to gas holder 10 via lines 11 and 12 to allow a flow of a reaction gas having a predetermined composition in gas holder 10 into fluidized bed reactor 1. Further, saturator 13 was provided between lines 11 and 12 to saturate the reaction gas with water.

Lines 14, 15 and 16 were connected in series to the upper portion of fluidized bed reactor 1 to direct an exhaust gas obtained after reaction to an incinerator apparatus (not shown). In addition, a dust of the feed contained in the exhaust gas was removed by dust collector 17 provided between lines 14 and 15 and filter 18 installed on line 15. The exhaust gas was cooled by gas cooler 19 installed on line 15 to condense water. The condensed water could be separated by drain separator 19a.

(2) Experimental Conditions and Results

An experiment for converting iron ore mainly containing hematite ($Fe_2O_3$) into iron carbide, that is, an experiment according to the present invention which is divided into partial reducing reaction and further reducing and carburizing reactions was carried out by performing a process for subjecting the iron ore to the first-stage reaction process using a reducing gas mainly comprising hydrogen, and then performing a process for subjecting the iron ore to the second-stage reaction process using a gas mixture containing a reducing gas and a carburizing gas mainly comprising hydrogen and methane. The iron ore had a composition of 97.3% by weight of $Fe_2O_3$, 1.4% by weight of FeO, and 1.3% by weight of Fe, and had a particle size of 1.0 mm or less 3.52 kg of the iron ore was supplied into fluidized bed reactor 1. The inside of fluidized bed reactor 1 had a pressure of 3 to 4 kgf/cm² G (G representing a gauge pressure), and had a temperature of 590 to 650° C. The compositions of the feed (raw material iron ore) and the reaction gas are changed as set forth in the following Table 1. In Table 1, (outlet side-inlet side) indicating the change in the reaction gas composition represents subtract (a mean value on the inlet side of fluidized bed reactor 1 during the period) from (a mean value on the outlet side of fluidized bed reactor 1 during the period) which are measured by the on-line gas chromatography method. That is to say, outlet side=a mean value on the outlet side of fluidized bed reactor 1 during the period;

inlet side=a mean value on the inlet side of fluidized bed reactor 1 during the period.

In Table 1, an initial stage means the first-stage reaction process, and middle and latter stages mean the second-stage reaction process.

TABLE 1

|  | Inital stage | | Middle stage | | Latter stage | |
| --- | --- | --- | --- | --- | --- | --- |
|  | 0 | 0.5 hr | 1.25 hr | 2.25 hr | 5.25 hr | 6.25 hr |
| Composition of Raw Material and Product | | | | | | |
| $Fe_2O_3$ | 97.3 | 0.2 | 1.4 | 0.6 | 0.0 | 0.0 |
| $Fe_3O_4$ | 0.0 | 59.2 | 18.8 | 13.0 | 5.8 | 5.1 |
| FeO | 1.4 | 29.5 | 34.7 | 19.6 | 2.6 | 1.7 |

TABLE 1-continued

| | | | | | | |
|---|---|---|---|---|---|---|
| Fe | 1.3 | 11.1 | 45.1 | 22.6 | 0.0 | 0.0 |
| $Fe_3C$ | 0.0 | 0.0 | 0.0 | 44.2 | 91.6 | 93.2 |

| | (Outlet side-<br>Inlet side) | (Outlet side-<br>Inlet side) | (Outlet side-<br>Inlet side) |
|---|---|---|---|
| | Reaction Gas Composition A<br>268 $Nm^3/hr$ | | |
| $CH_4$ | +1.8 | −0.3 | −3.1 |
| $H_2$ | −9.9 | −4.3 | +2.9 |
| $H_2O$ | +9.1 | +4.3 | +3.0 |
| | Reaction Gas Composition B<br>90 $Nm^3/hr$ | | |
| $CH_4$ | +1.1 | −4.8 | −2.0 |
| $H_2$ | −11.5 | −1.8 | +1.1 |
| $H_2O$ | +0.9 | +6.7 | +3.1 |

As is clearly shown in Table 1, the feed is partially reduced in the first-stage reaction process, and the further reduction and carburization are performed in the second-stage reaction process. It takes about 6.25 hours to obtain a conversion ratio of 93% or more which is suitable for an iron carbide product. More specifically, in the case that the feed (raw material) shown in Table 1 is subjected to the first-stage reaction process by using a reducing gas mainly comprising hydrogen and to the second-stage reaction process by using a gas mixture containing a reducing gas and a carburizing gas mainly comprising hydrogen and methane at a pressure of 3 to 4 $kgf/cm^2$ G and a temperature of 590 to 650° C., it is predicted that an iron carbide product having a conversion ratio of 93.2% into iron carbide can be obtained when 6.25 hours pass after the reaction begins (which will be hereinafter referred to as batch reaction data).

In the case where operating conditions such as a supply amount of the raw material, a composition of the raw material, a composition of a reaction gas, a flow rate of the reaction gas, a reaction pressure, a reaction temperature and the like are set to predetermined values in a specific fluidized bed reactor, a residence time distribution in each chamber in the reactor has a constant value. By executing a lot of experiments, it is possible to previously grasp a state of transfer under predetermined operating conditions of a specific fluidized bed. The residence time distribution means the following. In the fluidized bed reactor having a lot of chambers, the raw material in each chamber comprises a combination of various different residence-in-reactor times. The combination becomes constant if the operating conditions are determined. For example, if 25% of the raw material in some chamber has a residence-in-reactor time of 1 to 1.5 hours, 50% of the raw material has a residence-in-reactor time of 1.5 to 2 hours and 25% of the raw material has a residence-in-reactor time of 2 to 2.5 hours, this combination is referred to as the residence time distribution. Accordingly, if the above-mentioned batch reaction data are obtained by previously executing experiments for various kinds of iron ore materials, it is possible to predict a composition of an outlet side product when an iron ore material having a certain composition is charged into the fluidized bed reactor having a known transfer state as a product sum of the residence time distribution and the batch reaction data in the specific fluidized bed reactor. By selecting the operating conditions of the first-stage reaction process and the second-stage reaction process so that a predicted composition of the outlet side product is kept within the range of a goal product composition, it is possible to obtain an iron carbide product having goal quality.

When the range of the goal quality should be changed or the goal quality gets out of the same range, it is possible to control the quality by correcting the operating conditions (the supply amount of the raw material, the composition of the raw material, the composition of the reaction gas, the flow rate of the reaction gas, the reaction pressure, the reaction temperature and the like). Taking it into consideration that a state value which can be detected in a sufficiently short time for a response time under the operating conditions, and has a great gain for correction and a high astringency is effective in control of the quality under the operating conditions, the present inventors have found a method. An example of the method will be described below.

As a method for measuring a reduction ratio of a solid sample, a method for estimating the reduction ratio by measuring a magnetic permeability is preferable because it can be performed conveniently and rapidly. More specifically, if a relationship between the composition and the magnetic permeability of the iron carbide product is obtained in advance, effective countermeasures can be taken by using the relationship as a test curve. For example, the magnetic permeability of the solid sample at an outlet of the reactor for the first-stage reaction process or from a middle position to the outlet of the reactor for the first-stage reaction process is measured (in order to control a degree of partial reduction of the outlet side product at the outlet of the reactor for the first-stage reaction process), or the magnetic permeability of the solid sample at an outlet of the reactor for the second-stage reaction process or from a middle position to the outlet of the reactor for the second-stage reaction process is measured (in order to control quality (IC ratio) of the product obtained after the second-stage reaction process). If the magnetic permeability gets out of a preferable range on the test curve, the reaction gas composition or the reaction temperature is changed in the following manner. Consequently, it is possible to obtain an iron carbide product having a goal composition.

By adding methane to the reducing gas in the first-stage reaction process, a composition ratio of hydrogen can be changed. Consequently, it is possible to control the reaction time required for obtaining the reduction ratio in the first-stage reaction process and a predetermined reduction ratio. By adding hydrogen or methane to the reducing gas and the carburizing gas in the second-stage reaction process, a composition ratio of hydrogen to methane can be changed. Consequently, it is possible to control the reaction time required for obtaining a carburization ratio (conversion ratio into iron carbide) in the second-stage reaction process and a predetermined carburization ratio. In this case, if a sample is obtained in the middle position of the reactor in each reaction process, a variation in the magnetic permeability is great and an operating state can be grasped clearly. By early detecting the quality at the outlet of the reactor, it can be expected that effects of the quality control are increased. Furthermore, it is possible to control the carburization ratio of a final product, and the form and amount of residual iron oxide by performing the above-mentioned reaction processes.

It is preferable that the reaction temperature in the first-stage reaction process should be set to 550 to 750° C. If the reaction temperature is lower than 550° C., the reaction speed is low and the reaction time is increased. If the reaction temperature is higher than 750° C., it brings a problem to a heat resistant structure of the reactor. There is a possibility that the reducing reaction of hematite might cause sintering within the range of about 600° C. to about 700° C. and the reaction time might be increased. For this reason, the reaction has conventionally been performed at a temperature of about 590° C. which is lower than the above temperature range. According to the present invention, the reducing reaction is divided into two steps, and the reduction ratio in the first-stage reaction process is not increased greatly. Therefore, even if the reaction temperature is increased, the sintering is not caused and the reaction speed is not decreased.

The second-stage reaction process performs further reduction and carburization at the same time. The sintering is caused with more difficulty than in the case where only the reduction is carried out. Therefore, it is preferable that the reaction temperature should be set a little higher, that is, to about 610 to 750° C. in order to shorten the reaction process time. It is sometimes desirable that portions other than iron carbide in the iron carbide product should comprise Fe3O4 which is most stable. In that case, the reaction can be performed by setting a temperature of about 575° C. or less where a little unstable FeO is not present, for example, by setting the temperature of the second-stage reaction process to about 550 to 570° C., and residual iron can contain only Fe3O4.

As expressed by the general reaction formula, it is supposed that an amount of H2O in the reaction gas is increased if the reducing reaction and the carburizing reaction progress. If a change in the amount of H2O in the reaction gas is known, a degree of the progress in the reaction can be detected. If the amount of H2O in the reaction gas is measured by the on-line gas chromatography method, for example, various actions can be taken to detect the degree of the progress in the reaction by an H2O value and to control the progress in the reaction.

In some cases, the reaction progresses more quickly or slowly than in Table 1 depending on the kind of iron ore as set forth in the following Table 2. In Table 2, "reaction progresses quickly" means the case where a composition obtained after 1.25 hours in Table 1 was set to an initial value and a reaction for 2 hours was completed in one hour, and "reaction progresses slowly" means the case where the composition obtained after 1.25 hours in Table 1 was set to an initial value and the reaction for 0.5 hour required 1 hour.

TABLE 2

| | Reaction Progresses Quickly Early Stage of Reaction | Reaction Progresses Slowly Early Stage of Reaction |
|---|---|---|
| Composition of Raw Material and Product | | |
| $Fe_2O_3$ | 1.4 → 0.0 | 1.4 → 1.0 |
| $Fe_3O_4$ | 18.8 → 10.3 | 18.8 → 14.9 |
| FeO | 34.7 → 10.6 | 34.7 → 26.3 |
| Fe | 45.1 → 0.0 | 45.1 → 35.7 |
| $Fe_3C$ | 0.0 → 79.1 | 0.0 → 22.1 |
| | (Outlet side - Inlet Side) | (Outlet side - Inlet Side) |
| Reaction Gas Composition C 268 $Nm^3$/hr | | |
| $CH_4$ | −4.8 | −3.6 |
| $H_2$ | −0.3 | −0.2 |
| $H_2O$ | +5.0 | +3.8 |
| Reaction Gas Composition D 90 $Nm^3$/hr | | |
| $CH_4$ | −8.1 | −4.9 |
| $H_2$ | +0.6 | +0.2 |
| $H_2O$ | +9.1 | +5.1 |

Table 2 can also be utilized for detecting the degree of the progress in the reaction in the same manner as Table 1.

(3) Summary of Producing Apparatus

Figure 2:
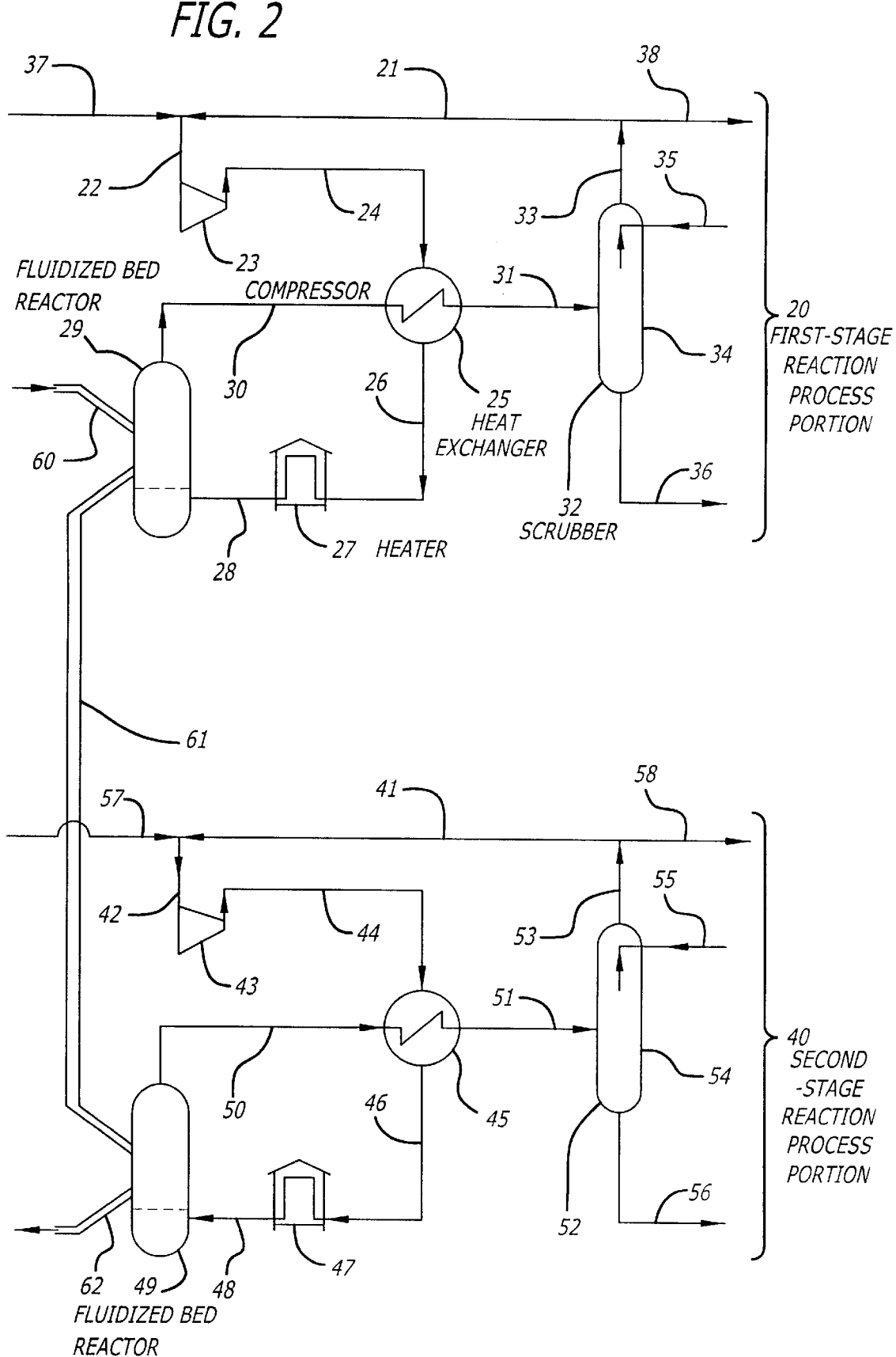
FIG. 2 is a view showing a schematic structure of an embodiment of an apparatus for producing iron carbide for applying the method for producing iron carbide according to the present invention.

FIG. 2 is a view showing a schematic structure of an iron carbide producing apparatus suitable for applying the method for producing iron carbide according to the present invention. The producing apparatus comprises first-stage reaction process portion 20 for performing partial reducing reaction of an iron-containing material for iron making, and second-stage reaction process portion 40 for performing further reducing reaction and carburizing reaction. First-stage reaction process portion 20 includes lines 21 and 22, compressor 23, line 24, heat exchanger 25, line 26, heater 27, line 28, fluidized bed reactor 29, line 30, heat exchanger 25, line 31, scrubber 32 and line 33 which form a loop. A reaction gas is supplied to a bottom gas inlet of fluidized bed reactor 29 through line 22, compressor 23, line 24, heat exchanger 25, line 26, heater 27 and line 28, and flows from a top gas outlet of fluidized bed reactor 29 to line 30, heat exchanger 25, line 31, scrubber 32, line 33, line 21 and line 22 in order. Thus, a loop for causing a first reaction gas to circulate is formed. Although a pressure is dropped while the gas circulates in each device, the pressure is raised properly by compressor 23 so that the reaction gas can circulate in the loop. The reaction gas flowing into fluidized bed reactor 29 exchanges heat with a reacted gas flowing out of reactor 29 by heat exchanger 25, and is further heated by heater 27 to a suitable reaction temperature. Scrubber 32 comprises hollow body 34, line 35 for jetting water into the gas, and line 36 for discharging water in body 34, and serves to cool the gas flowing out of reactor 29, and condenses and removes steam in the gas. Furthermore, a gas having a predetermined composition is supplied to a circulation path through line 37 connected to a portion where lines 21 and 22 are coupled to each other. In addition, a predetermined amount of the gas can be exhausted from the circulation path via line 38 connected to a portion where lines 33 and 21 are coupled to each other. By regulating the quantity of the supply gas and the exhaust gas, the composition of the reaction gas flowing into reactor 29 is fixed and a change in the gas composition and a decrease in the reaction speed by the reaction can be prevented from being caused.

A flow of the reaction gas in second-stage reaction process portion 40 is also the same as in first-stage reaction process portion 20. Therefore, common portions are indicated at reference numerals having 20 attached to the reference numerals of first-stage reaction process portion 20, and description will be omitted.

A flow of the feed (raw material) into the reactors is as follows Fine-sized iron ore is steadily supplied into an upper portion of fluidized bed reactor 29 of first-stage reaction process portion 20 thereinto through line 60. The fine-sized iron ore which has completely been subjected to the partial reducing reaction is continuously supplied from a lower portion of fluidized bed reactor 29 to fluidized bed reactor 49 of second-stage reaction process portion 40 through line 61. Further reducing reaction and carburizing reaction are performed in fluidized bed reactor 49, and the converted iron carbide is continuously discharged through line 62.

It is sufficient that only reducing reaction is taken into consideration for the first-stage reaction process as the composition of the reaction gas used in each process. Therefore, the first-stage reaction process is performed by using the reducing gas mainly comprising hydrogen. For this reason, a hydrogen concentration and a reaction speed of the reducing reaction can be increased, and the reaction time can be shortened more than in the prior art. Since the reducing reaction and the carburizing reaction should be taken into consideration for the second-stage reaction process, a gas mixture containing hydrogen and methane is used. However, the reducing reaction partially progresses in the first-stage reaction process. Therefore, importance can be attached to the carburizing reaction. Accordingly, a methane concentration can be raised to increase the speed of the carburizing reaction and to shorten the reaction time. A constant amount of methane can be added to the reducing gas mainly comprising hydrogen in the first-stage reaction process to decrease the hydrogen concentration and to control the speed of the reducing reaction. By regulating the methane concentration of the reaction gas in the second-stage reaction process, the speed of the carburizing reaction can be controlled, deposition of free carbon can be decreased and the reaction time to obtain a predetermined carburization ratio can be controlled.

Figure 3:
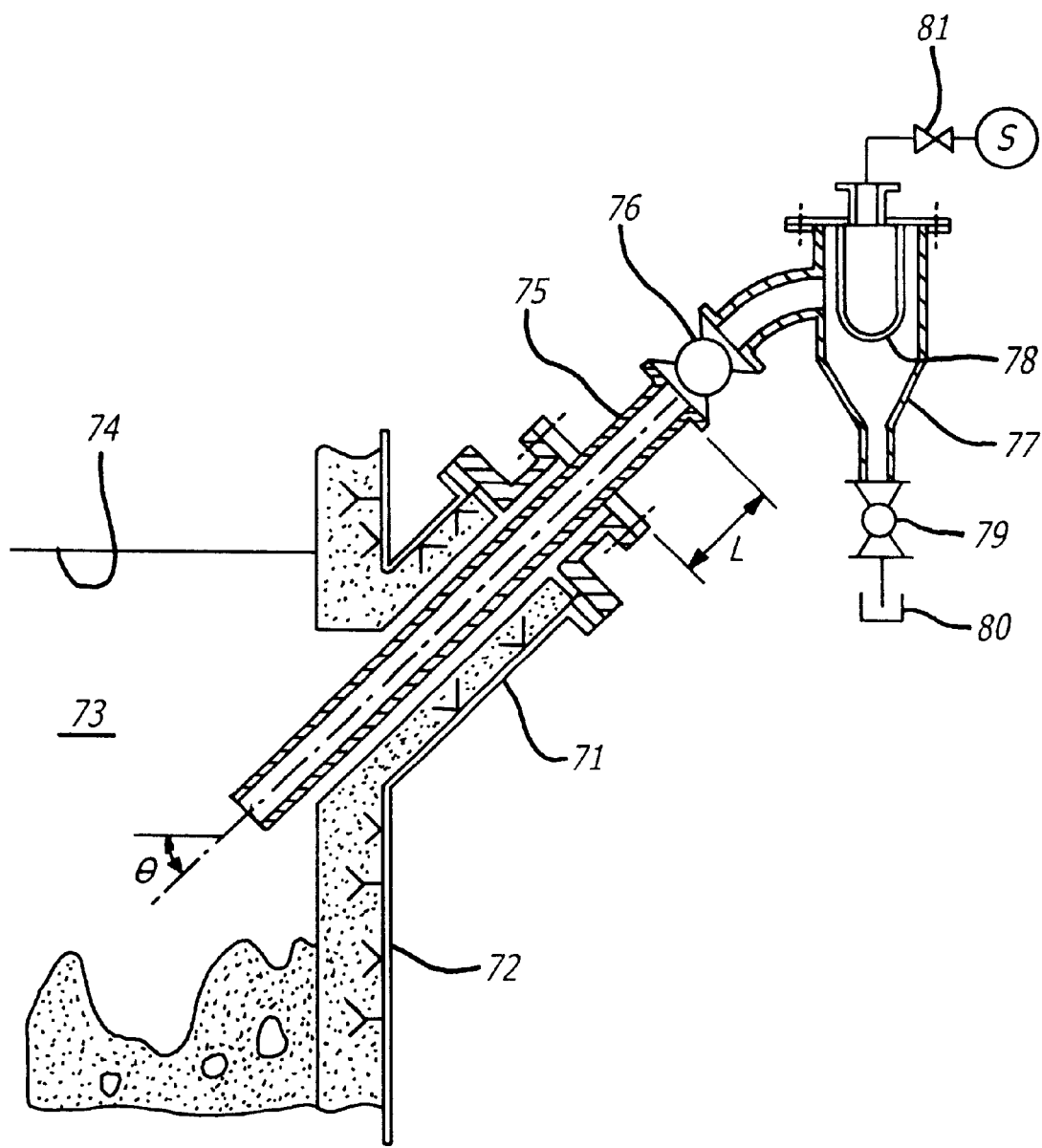
FIG. 3 is an enlarged view showing a gas sampling portion of a fluidized bed reactor.

FIG. 3 is an enlarged view showing a gas sampling portion of a fluidized bed reactor. In FIG. 3, suction portion 71 is fixed in a lower position than top 74 of partition wall 73 of the fluidized bed reactor diagonally with respect to sidewall 72 of the fluidized bed reactor. It is preferable that a gradient (angle θ) of suction pipe 75 for insertion into suction portion 71 should be sufficiently greater than an angle of repose of the feed (raw material). It is preferable that a lot of air should not be sucked and that a flow velocity should be set without fine particles having a size of $10\mu$ or more. Preferably, a distance L between valve 76 attached to suction pipe 75 and suction portion 71 is comparatively increased and a temperature of valve 76 is decreased by radiation of heat therebetween. Filter 78 made of glass wool is attached to the inside of dust separator 77 installed on a rear face of valve 76, thereby removing a dust. Valve 79 is fixed to a bottom of dust separator 77, and dust pot 80 is provided. It is preferable that the gas should be discharged in an amount of about 100 milliliter/min. from valve 81 installed on a top of dust separator 77. In order to prevent generation of drain, it is preferable that dust separator 77, other accessory valves and the like should be put in a thermostatic box.

By using a gas sampling apparatus having the above-mentioned structure, an exhaust gas sample is taken for each chamber from the inlet to the last chamber of the outlet in the reactor for the first-stage reaction process (in order to control the degree of the partial reduction of the outlet side product at the outlet in the reactor for the first-stage reaction process), or an exhaust gas sample is taken for each chamber from the inlet to the last chamber of the outlet in the reactor for the second-stage reaction process (in order to control the quality (IC ratio) of the product obtained after the second-stage reaction process) to measure these gas compositions by the gas chromatography method or the like. If the gas composition gets out of the preferable range, the quality (IC ratio) of the product can be controlled by changing the gas compositions in the first-stage reaction process and the second-stage reaction process as described above.

INDUSTRIAL APPLICABILITY

Since the present invention has the above-mentioned constitution, the present invention is suitable to an apparatus for obtaining an iron carbide product having a goal composition in a two-stages reaction process.

What is claimed is:

1. A method of managing an operation of an iron carbide producing process, comprising steps of:

performing a first-stage reaction process for partially reducing various iron-containing materials for iron making, and then performing a second-stage reaction process for carrying out further reduction and carburization;

taking a solid sample at an outlet of a reactor for the first-stage reaction process to measure a magnetic permeability of the solid sample;

obtaining a reduction ratio of the solid sample from the magnetic permeability as measured using a relationship between the composition and the magnetic permeability of the iron carbide product, which was obtained in advance; and regulating a parameter capable of changing the reduction ratio of the first-stage reaction process to adjust an iron carbide ratio obtained after the second-stage reaction process using a relationship that assuming a reaction time is set constant the iron carbide ratio obtained after the second-stage reaction process is decreased if the reduction ratio of the first-stage reaction process is decreased and the iron carbide ratio obtained after the second-stage reaction process is increased if the reduction ratio of the first-stage reaction process is increased.

2. The method of managing an operation of an iron carbide producing process according to claim 1, wherein the solid sample is taken between the middle and end of the reactor for the first-stage reaction process in place of the solid sample at the outlet of the reactor for the first-stage reaction process to measure a magnetic permeability of the solid sample;

obtaining a reduction ratio of the solid sample from the magnetic permeability as measured using a relationship between the composition and the magnetic permeability of the iron carbide product, which was obtained in advance;

and the parameter capable of changing the reduction ratio of the first-stage reaction process is regulated corresponding to a correlation between the reduction ratio of the solid sample and the reduction ratio obtained after the first-stage reaction process;

thereby adjusting iron carbide ratio obtained after the second-stage reaction process.

* * * * *